United States Patent [19]

Spigarelli

[11] 4,253,399
[45] Mar. 3, 1981

[54] RAILWAY LOCOMOTIVE FUEL SAVING ARRANGEMENT

[75] Inventor: Rudolph D. Spigarelli, Shreveport, La.

[73] Assignee: Kansas City Southern Railway Company, Kansas City, Mo.

[21] Appl. No.: 102,271

[22] Filed: Dec. 10, 1979

Related U.S. Application Data

[63] Continuation of Ser. No. 797,502, May 16, 1977, abandoned.

[51] Int. Cl.³ .......................... B61C 3/00; B61C 5/00; B61C 17/12
[52] U.S. Cl. ...................................... 105/62 R; 105/61
[58] Field of Search ................................ 105/61, 62 R

[56] References Cited

U.S. PATENT DOCUMENTS

| 3,380,399 | 4/1968 | Southard et al. | 105/61 |
| 3,384,032 | 5/1968 | Ruff | 105/61 |
| 3,384,033 | 5/1968 | Ruff | 105/61 |
| 3,696,758 | 10/1972 | Godinez, Jr. | 105/61 |
| 3,698,325 | 10/1972 | Grundy | 105/61 |
| 4,041,283 | 8/1977 | Mosier | 105/61 X |

FOREIGN PATENT DOCUMENTS

| 281640 | 11/1927 | United Kingdom | 105/61 |
| 393275 | 5/1933 | United Kingdom | 105/62 R |
| 519891 | 4/1940 | United Kingdom | 105/62 R |
| 808657 | 2/1959 | United Kingdom | 105/62 R |
| 1007193 | 10/1965 | United Kingdom | 105/62 R |
| 1056810 | 2/1967 | United Kingdom | 105/62 R |
| 1081602 | 8/1967 | United Kingdom | 105/62 R |
| 1099140 | 1/1968 | United Kingdom | 105/62 R |
| 1133075 | 11/1968 | United Kingdom | 105/62 R |

*Primary Examiner*—Howard Beltran
*Attorney, Agent, or Firm*—Lowe, Kokjer, Kircher, Wharton & Bowman

[57] ABSTRACT

This invention discloses a method and device for reducing fuel consumption by a locomotive system comprised of a plurality of tandem diesel locomotives electrically interconnected so that one of the units is a lead unit and the remaining units are trailing units. In particular, the fuel saver arrangement of the present invention is capable of selectively placing one or more of the locomotives in the system in a "throttle one" power position without causing any significant reduction in the operating efficiency of the system's safety equipment. The locomotive is placed in the throttle one power position by means of switching relays that are operable to override the normal throttle control circuit of the locomotive. These relays respond to a fuel save signal that is generated in the control box located on the lead unit. The control box includes a fuel save switch operable to initiate and terminate the fuel save operation and a unit selector switch operable to select the locomotive to be reduced in power. Each locomotive within the system is also provided with a fuel saver set-up switch which electrically interconnects all of the diesel units of the system. The unit selector switch and the fuel saver set-up switches are multiple position gang switches which operate in conjunction with each other to provide the fuel save signal to the proper locomotive to be reduced in power by means of the unused train line wires and jumper cables present in a normal locomotive system.

9 Claims, 9 Drawing Figures

RAILWAY LOCOMOTIVE FUEL SAVING ARRANGEMENT

BACKGROUND AND BRIEF DESCRIPTION OF THE INVENTION

This application is a continuation of my prior application Ser. No. 797,502, filed May 16, 1977, now abandoned.

This invention relates in general to a unique fuel saver arrangement wherein the power output of one or more of the locomotives in a tandem diesel locomotive system can be independently decreased without any overall reduction in the operating efficiency of the system's safety equipment. In particular, the fuel saver arrangement of the present invention is comprised of a fuel saver switch for initiating the fuel saving function, a unit selector switch for selecting the particular locomotive within the system to be reduced in power, and a fuel saver set-up switch for operably interconnecting all of the diesel units of the system by means of the unused train lines and jumper cables present in a normal locomotive system.

Practically every locomotive in operation today is powered by diesel fuel. The cost of such fuel constitutes one of the greatest expenses involved in the operation of a train system. Rising fuel prices have placed a great economic burden on the nation's railroads, necessitating the curtailment of fuel usage. Since the amount of fuel consumed by a diesel locomotive is directly proportional to the power output of the unit, any reduction in the output power of one or more of the units will result in a proportional fuel savings.

A typical locomotive system is made up of two or more diesel locomotives arranged in tandem. One of the locomotives is designated as the lead unit and serves as the control center for the entire system. The other locomotives are called trailing units and each is assigned a specific location within the system. All of the locomotives in the system are mechanically and electrically connected together and each trailing unit responds to the throttle setting of the lead unit. In order to accommodate the relatively great loads encountered by today's railroads, a locomotive system must be made up of several diesel units which form an integrated system. In most cases, the greatest percentage of the locomotives' "run" requires only a minimum amount of locomotive power for moving the train and its load along the track. Maximum power output from all of the units of the system is only required when the train system is moving along an upgrade or starting from a stationary position. Even through the system need not operate at maximum power during the entire "run", the locomotive system must be provided with enough diesel units to meet the periods of high power demand.

At the present time, the extra diesel units which are provided solely for periods of high demand cannot be selectively reduced in power during periods of lower power demand without affecting the overall operating efficiency of the system's safety equipment. Instead, the best way to reduce fuel consumption at the present time is to cut back the output power of all of the diesel units in the locomotive system. In other words, all of the units within the system are operated at less than maximum power. Operating all of the individual locomotive units at less than maximum power decreases the overall operating efficiency of the system and consequently provides only limited fuel savings.

The fuel saving arrangement of the present invention, however, is operable to selectively reduce the power output of one or more of the diesel units while leaving the other units in the system unaffected. The unaffected units may continue to be operated at or near full throttle where operating efficiency is at a maximum.

The present invention provides control circuitry for placing one or more units in a throttle one position regardless of the throttle setting on the lead unit. In this position the power plant is effectively in idle but power is provided to the traction motors of the engine so as to maintain various safety equipment operational. The throttle one power condition is initiated by switching relays which are operable to override the normal throttle control circuitry of the locomotive. These relays respond to a fuel save signal that is generated in a control box. The control box is comprised of a fuel saver switch operable to initiate and terminate the generation of this signal and a unit selector switch operable to select the locomotive in the system to which the signal will be provided. The lead unit and each of the trailing units of the system are also provided with a fuel saver set-up switch. This switch operably couples the control box and the override relays in such a manner as to standardize the design of the system so that the constituent units of the system will be interchangeable with each other and with locomotives from other systems.

Further flexibility is introduced into the fuel saver arrangement of the present invention by providing each locomotive of the system with a control box in addition to a fuel saver set-up switch. If each unit of the system is equipped with both a fuel saver set-up switch and a control box, then each unit of the system will be identical so that any locomotive within the system can be selected as the lead unit.

It is therefore an object of the present invention to provide a fuel saver arrangement for use in a tandem locomotive system that can decrease the fuel consumption of the overall system during periods of reduced power demand by selectively reducing the power output of one or more of the locomotives in the system while leaving other units operating at their maximum efficiency.

A further object of the present invention is to provide a fuel saver arrangement for use in a tandem locomotive system that can decrease the overall fuel consumption of the system during periods of reduced power demand by effectively reducing the output power of one or more of the constituent units by placing the unit in a throttle one position without affecting the safety equipment on any of the units.

A further object of the invention is to provide a fuel saver arrangement for use in a tandem locomotive system wherein the fuel saving function is regulated by a central control box having a fuel saver switch for initiating the fuel save function and a unit selector switch for selecting the constituent unit or units to be placed in a throttle one power position.

It is also an object of the present invention to provide a fuel saver arrangement for use in a tandem locomotive system wherein the fuel saving function is accomplished by providing a fuel save signal generated in a central control box to switching relays that are added to the normal throttle control circuitry of the locomotive. The fuel save signal is capable of activating these switching relays which are operable to override the normal throttle control circuitry thereby placing the locomotive in a throttle one power position regardless of the throttle setting of the lead unit.

Another object of the present invention is to provide a fuel saver arrangement for use in tandem locomotive systems wherein each locomotive of the system is provided with a fuel saver set-up switch that is capable of interconnecting all of the units within the system by means of the unused train line wires and jumper cables present in a normal locomotive system.

Another object of the present invention is to provide a fuel saver arrangement for use in a tandem locomotive system that is of a standard design so that the constituent units of the system will be interchangeable with each other and with locomotives from other systems.

An additional object of the present invention is to provide a fuel saver arrangement for use in tandem locomotive systems wherein each locomotive of the system is provided with a standard control box so that any unit of the system can be used as the lead unit.

Other and further objects of the invention, together with the features of novelty appurtenant thereto will appear in the course of the following description of the drawing.

DETAILED DESCRIPTION OF THE INVENTION

In the accompanying drawings, which form a part of the specification and are to be read in conjunction therewith, and in which like reference numerals are employed to indicate like parts in the various views.

Figure 3:
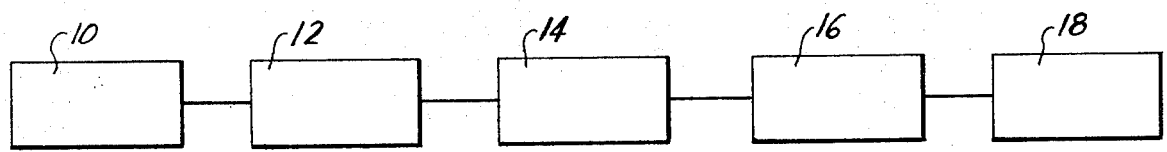
FIG. 3 is a block diagram of a locomotive system including five diesel units connected in tandem.

A typical locomotive system is shown in block form in FIG. 3. As shown in this figure, the system is made up of five diesel locomotives generally designated by the numerals 10, 12, 14, 16 and 18. The locomotives of the system are arranged in tandem and are electrically coupled in any suitable manner well known in the art. In particular, these units are electrically interconnected by means of a standard 27-cable conductor means not shown in this figure. All of the diesel units are substantially identical to one another and any one of the units may be designated as the lead unit with the other units designated as the trailing units. However, for the purposes of discussion, locomotive 10 will be designated as the lead unit and locomotive 12, 14, 16 and 18 will be designated as the number two trail unit, the number three trail unit, the number four trail unit and the number five trail unit, respectively.

Each locomotive in the system is provided with its own independent throttle control circuit which, in the interest of brevity, is not shown, although such circuitry is well known to those skilled in the art. These throttle control circuits have multiple throttle positions with each position representing a different power output of the locomotive. Typically, a system will have eight throttle positions with each ascending number representing increasing power output. Even though each locomotive of the system is equipped with its own throttle control circuit, all of the trailing units respond to the throttle setting in the lead unit in the normal mode of operation. In other words, the power output of the entire system is dependent upon the position of the lead unit throttle.

Figure 1:
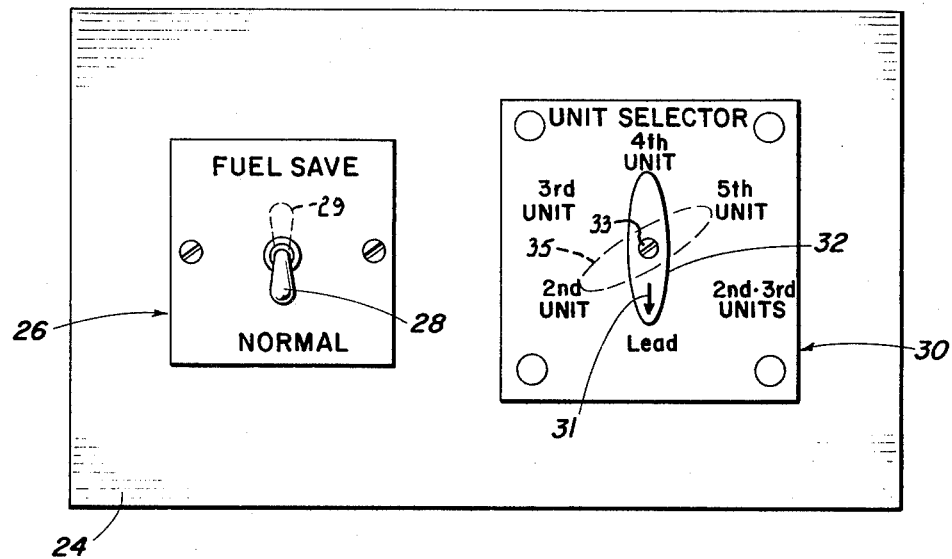
FIG. 1 is a frontal view of the control box located on the lead unit having a fuel saver switch and a unit selector switch.
Figure 2:
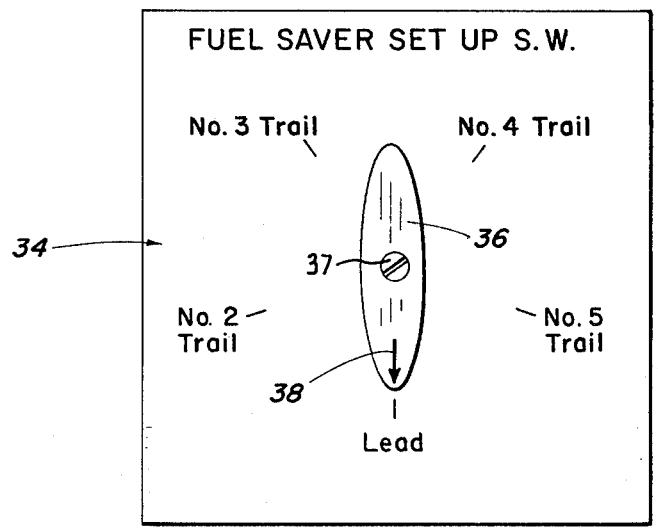
FIG. 2 is a frontal view of the fuel saver set-up switch located on each of the constituent units of the system.

Initiation of the fuel saving function of the present invention and selection of the locomotive to be placed in the throttle one power condition is regulated by the control box shown in FIG. 1. This box is mounted on the lead unit 10 in any suitable location for the convenience of the train engineer. As shown in FIG. 1, the control box includes a fuel saver switch 26 for initiating the fuel save function and a unit selector switch 30 for selecting the locomotives to be reduced in power.

Figure 4:
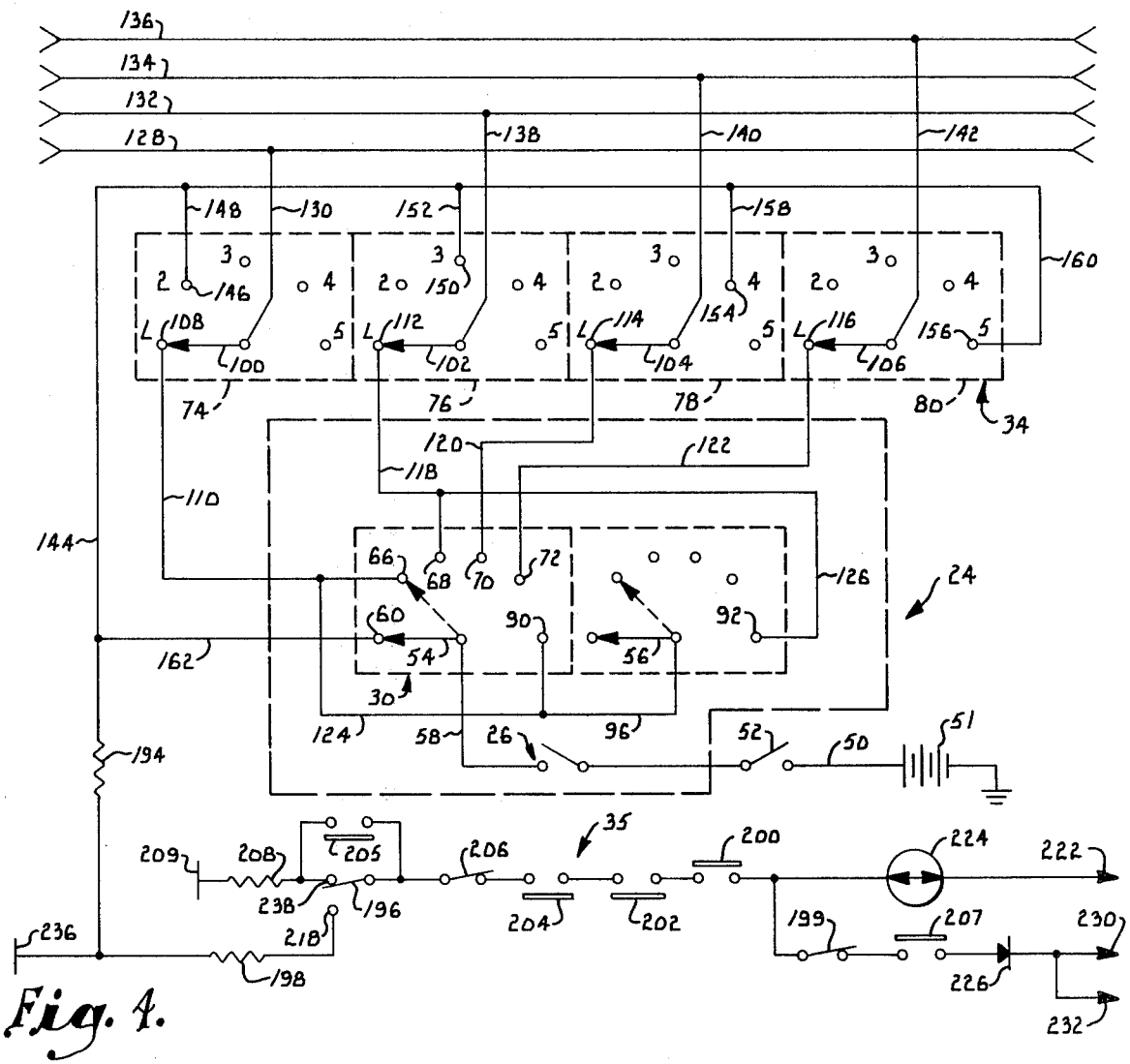
FIG. 4 is a schematic diagram showing control circuitry which is installed on the lead locomotive of a multi-unit locomotive system in accordance with a preferred embodiment of the fuel saver arrangement of the present invention.

Referring now to FIGS. 1 and 4, the control box, fuel saver switch, unit selector switch and fuel saver set up switch are generally designated on these figures by the numerals 24, 26, 30 and 34, respectively. Numeral 35 generally designates circuitry which is used to initiate the fuel save function in accordance with the present invention, as will be described more fully. The circuitry 35 constitutes a modification which is made to the conventional throttle control circuitry of the engine. A fuel save signal is provided to the control box 24 in the form of a positive voltage signal by means of an input line 50 which connects with a battery 51. Relay contact 52 is provided in line 50 to inhibit the fuel save operation of the present invention whenever the throttle control circuit on the lead unit is set in the idle position. This relay contact is controlled by a relay solenoid not shown in these figures. Placement of the throttle control circuit on the lead unit in the idle position causes the solenoid to be energized thereby opening relay contact 52.

The fuel saver switch 26 is a two-position toggle switch or any other suitable type of switching means having two switching states. As shown in FIG. 1, these two switching states include the normal operating position 28 and the fuel save position 29. In the normal operating position 28, the fuel saver switch is in an open position as shown in FIG. 4.

The unit selector switch 30, on the other hand, is a six contact, two gang switch, or any other suitable type of switching means having six different switching states and two separate sets of contacts. This switch includes two movable contacts 54 and 56 which move simultaneously in response to movement of rotatable switch element 32 (shown in FIG. 1). This switch element is secured to the movable contacts 54 and 56 by means of mounting screw 33. An indicator arrow 31 is included on switch element 32 to denote which of the switch positions is activated.

Stationary contacts 60, 66, 68, 70, 72 and 90 and 92, respectively, represent the lead, second unit, third unit, fourth unit, fifth unit and second/third unit switch settings shown in FIG. 1. As viewed in FIGS. 1 and 4, the unit selector switch 30 is shown in the lead position while the second unit position is shown in broken lines. In the lead position, contact 54 is set on contact 60 to connect line 58 with contact 60. In the second unit position, movable contact 54 connects line 58 with stationary contact 66.

Referring now to FIGS. 2 and 4–8, the fuel saver set-up switch is generally designated on these figures by the numeral 34. One switch 34 is located on each locomotive in the system, and each switch 34 as shown herein is a five contact, four gang switch. Since each set-up switch 34 is identical to the others, only one will be described in detail. Each switch 34 has first, second, third and fourth gang segments 74, 76, 78 and 80, respectively. Each gang segment is provided with a movable contact 100, 102, 104, and 106, and all of these contacts move simultaneously in response to movement of rotatable switch element 36 (shown in FIG. 2). This element is secured to the movable contacts by means of mounting screws 37 and has an indicator arrow 38 superimposed thereon to denote the position of the switch.

Referring now specifically to FIG. 4, this figure shows the electrical schematic for the lead locomotive 10 and particularly the electrical interconnection of the fuel saver set-up switch 34 and the control box 24 of the lead unit 10. The lead contact 108 on the first gang segment of the fuel saver set-up switch is connected directly to the second unit stationary contact 66 of the unit selector switch by means of conductor line 110. Similarly, the lead contacts 112, 114 and 116 on the second, third and fourth gang elements of the fuel saver set-up switch of the lead unit 10 are electrically connected to the third unit, fourth unit and fifth unit stationary contacts 68, 70 and 72 by means of conductor lines 118, 120 and 122, respectively. Stationary contacts 90 and 92 represent the second/third units position of the unit selector switch 30 and are respectively connected to the lead contact of the first and second gang segments of the fuel saver set-up switch. Stationary contact 90 is connected to the lead contact 108 by means of conductor lines 124 and 100. Stationary contact 92, on the other hand, is connected to the lead contact 112 of the second gang segment 76 by means of conductor lines 126 and 118.

The movable contacts of each gang segment of each set-up switch 34 are electrically connected to a different train line wire. Movable contact 100 is electrically connected to train line wire 128 by means of conductor line 130 while movable contacts 102, 104 and 106 are electrically connected to train line wires 132, 134 and 136 by means of conductor lines 138, 140 and 142, respectively. These train line wires are part of a conventional twenty-seven cable electrical group used to electrically interconnect all of the locomotives of the system in a manner well known to those skilled in the art. It is to be understood that each set-up switch 34 has four different conductor lines 130, 138, 140 and 142 which connect to the respective train line wires 128, 132, 134 and 136 at locations offset from the connection points of the conductor lines of the set-up switches 34 for the remaining locomotive units.

Each gang segment of the fuel saver set-up switch of the lead unit 10 is connected with a throttle control line 144 of the lead unit which in turn connects with control circuitry 35. For example, the first gang segment 74 is electrically connected to throttle control line 144 by means of its number 2 trail stationary contact 146 and conductor line 148. Similarly, the number 3 trail contact 150 on the second gang segment 76 is connected to throttle control line 144 by means of conductor 152. The fourth trail contact 154 on the third gang segment 78 and the fifth trail contact 156 on the fourth gang segment of the fuel saver set-up switch are also electrically connected to the throttle control line 144 by means of conductor lines 158 and 160, respectively. A conductor line 162 leads from contact 60 to connection with line 144.

FIGS. 5–8 show the electrical circuitry and particularly the set-up switches 34 for the trailing units 12, 14, 16 and 18 of the locomotive system shown in FIG. 3. The number two, three, four and five trail units are respectively repesented by FIGS. 5, 6, 7 and 8. The trailing units shown in FIGS. 5–8 are each equipped with a fuel saver set-up switch 34 but do not have a fuel save switch 26 or a unit selector switch 30.

Figure 5:
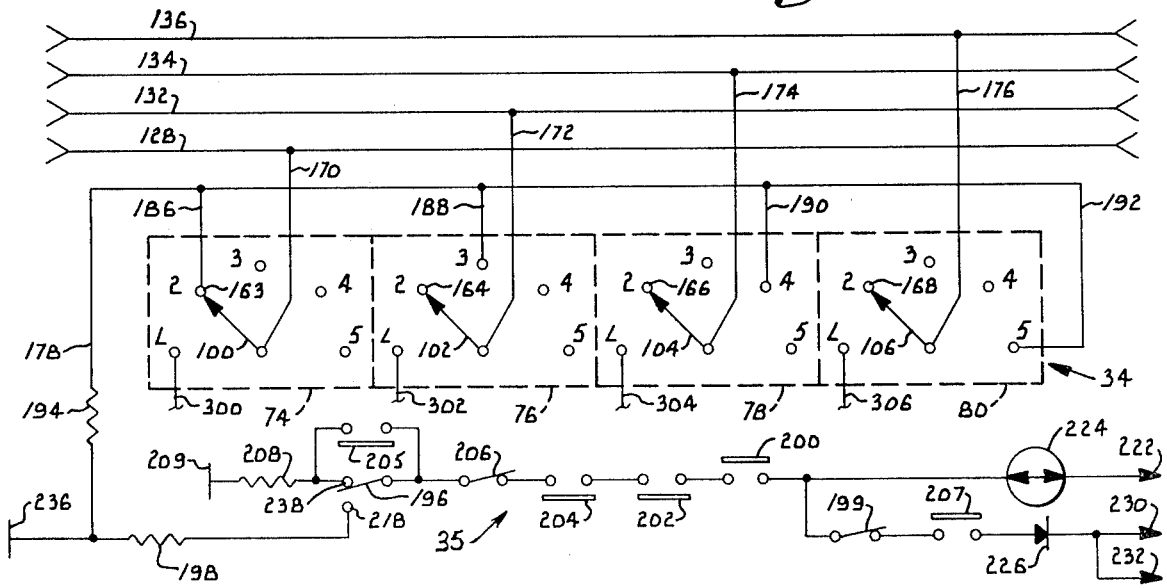
FIG. 5 is a schematic diagram of a fuel saver set-up switch is installed on the number two trailing locomotive unit of the system, with the switch set in a "number two trail" positional setting.

The fuel saver set-up switch 34 on the number two trail unit 12 is shown in FIG. 5. Since this locomotive is the number two trail unit of the system, its fuel saver set-up switch 34 is set in the number two trail position as shown in this figure. In the number two trail position, movable contacts 100, 102, 104 and 106 are respectively connected to the second position stationary contacts 163, 164, 166 and 168. The movable contacts are also connected to the appropriate train line wires 128, 132, 134 and 136 by means of respective conductor lines 170, 172, 174 and 176 which correspond to line 130, 138, 140 and 142 shown in FIG. 3. The movable contacts on corresponding gang sections of the different set-up switches 34 are thus electrically coupled to the same train line wires. In other words, the movable contact on the first gang section of the fuel saver set-up switch on the lead unit and the movable contact of the first gang section on each trailing unit are connected to train line wire 128. Likewise, train line wire 132 is connected to the movable contact of the second gang section of the fuel saver set-up switch on each locomotive of the system, and so forth.

Numeral 178 designates a throttle control line of the second locomotive unit 12 which corresponds to the throttle control line 144 of the lead unit 10 shown in FIG. 4. On the set-up switch 34 for unit 12, line 186 connects the number two contact of the first gang segment with line 178. Line 178 is similarly connected with the number three contact of the second gang segment by line 188, with the number four contact of the third gang segment by line 190, and with the number five contact of the fourth gang segment by line 192. Control line 178 leads to the circuitry 35 of the number two trail unit 12 in the same manner as line 144 leads to the identical circuitry 35 of the lead unit 10.

The number three trail unit 14, the number four trail unit 16, and the number five trail unit 18 are each equipped with a set-up switch 34 and associated circuitry which is identical to that described in connection with the number two trail unit 12 shown in FIG. 5. The only difference between the various trail units is that the number three unit has its movable contacts 100–106 set in the number three position or in contact with the number three stationary contacts of the gang sections 74–80 (see FIG. 6), while the number four and five units have their movable contacts set in the number four position and the number five position, respectively (see FIGS. 7 and 8). It is to be understood that each of the trailing units has a conductor line corresponding to the line 178 shown in FIG. 5 and circuitry identical to the circuitry 35 which will subsequently be described in detail, such components being omitted from FIGS. 6–8 for the sake of brevity. It should be understood that the trail units may be equipped with a control box which would be connected with conductor lines 300, 302, 304 and 306 shown in FIG. 5 for the number two trail unit.

It should be pointed out that the stationary contacts of the unit selector switch 30 could be directly connected to the appropriate trailing units of the system, thereby eliminating the need for the fuel saver set-up switch altogether. However, the inclusion of a fuel saver set-up switch standardizes the design of the fuel saver arrangement of the present invention so that the locomotives of the system may be interchanged with each other and with locomotives of other systems by simply changing the positional setting of the fuel saver set-up switch. Further flexibility may be introduced into the arrangement by providing each locomotive with a control box that is interconnected with the fuel saver set-up switch in the manner shown in FIG. 4. If each unit within the system is equipped with a fuel saver set-up switch and a control box, then any unit within the system can be used as the lead unit.

Reference is now made to FIGS. 4 and 5 for a more detailed description of the fuel save initiating circuitry 35 on the lead locomotive (see FIG. 4) and on the trail units (see FIG. 5) of the system. Since the circuitry 35 for each locomotive unit is identical in every respect, the circuitry for each unit will be described simultaneously with reference to FIGS. 4 and 5.

As shown in these Figs., the fuel save initiating circuitry 35 comprises a modification of the conventional throttle control circuitry which is located within a standard locomotive. The principal component of the fuel save initiating circuitry 35 is the relay coil 208 of the engine run relay which is a conventional item well known to those of ordinary skill in the art. This relay is used to control various sections of the engine's throttle control circuitry so as to govern the operation of the speed setting solenoids. In particular, energization of the engine run relay coil 208 causes it to place its associated relay contact (not shown in FIGS. 4 and 5) in position to respond to the locomotive's throttle position, thereby allowing the engine of the locomotive to run normally. De-energization of engine run relay coil 208, on the other hand, causes it to position its associated relay contact so as to prevent the engine from running above idle speed thereby implementing the fuel save operation of the present invention.

Engine run relay coil 208 is electrically coupled in series with an isolation switch 224 and a plurality of normally closed relay contacts 200, 202, 204, and 206 between a positive feed 222 and a negative terminal 209. Positive feed 222 is electrically coupled with additional throttle control circuitry which is arranged to provide a positive voltage signal to positive feed 222 whenever the locomotive is in normal operation. Isolation switch 224 is a conventional item which is commonly found in locomotives, and it has a start/stop/isolate position wherein the engine will not run above idle speed and a run position wherein the engine will operate normally. Isolation switch 224 is capable of being physically moved between these two positions by the engineer operating the locomotive. When the isolation switch is in the run position, the positive voltage signal provided to positive feed 222 is applied to the engine run relay coil 208 thereby allowing the engine to respond to throttle position and operate normally. If, on the other hand, the isolation switch 224 is placed in the start/stop/isolate position, the positive voltage signal applied to positive feed 222 during normal operation is prevented from reaching the engine run relay coil 208, thereby de-energizing this relay coil. De-energization of this relay coil in turn prevents the engine from running above idle speed thereby taking this locomotive off line.

The position of relay contacts 200, 202, 204, 206 is controlled by various alarm devices so that one or more of these contacts are placed in an open condition whenever an alarm condition occurs, thereby preventing the engine from running above idle speed. These alarm devices are standard equipment on a locomotive and are not pertinent to the present invention. Relay contact 205 is maintained in an open position when the locomotive is operating normally.

The positive voltage signal which is provided to positive feed 222 is also provided to an associated alarm device (now shown herein) through relay contacts 199 and 207, diode 226 and outputs 230 and 232. This alarm device is arranged to sound a bell whenever the engine is shut down while isolation switch 224 is in the run position.

All of the above-described components constitute standard equipment which is well known to those of ordinary skill in the art and which are normally found on conventional locomotives. The remainder of the description pertaining to the fuel save initiating circuitry 35 details components which are added to the normal throttle control circuitry to initiate the fuel save operation of the present invention in response to a fuel save signal.

The fuel saver arrangement of the present invention makes use of the engine run relay to initiate a fuel save condition in response to a fuel save signal. A relay contact 196 is added in series with the engine run relay coil 208. The position of relay contact 196 is controlled by a relay coil 194 which is installed in throttle control line 144 (or 178 for the number two unit). Relay coil 194 is electrically coupled in series with the throttle control line and a negative terminal 236 such that the coil is energized upon receipt of a fuel save signal applied to the throttle control line. Relay contact 196 is maintained in electrical contact with a stationary contact 238 as long as coil 194 is in a de-energized condition. Energization of relay coil 194 causes relay contact 196 to be moved into electrical engagement with stationary contact 218 thereby interrupting the flow of current to relay coil 208.

A second relay called the engine run extra relay is provided to remove the alarm device (not shown in FIGS. 4 and 5) from the system so that the alarm will not sound when the locomotive is placed in a throttle one condition in response to a fuel save signal. The coil of this relay is designated by the numeral 198 and is electrically coupled between stationary contact 218 and negative terminal 236. Normally closed contact 199 serves as the relay contact of the engine run extra relay.

Contact 199 is maintained in a closed condition whenever relay coil 198 is de-energized and is opened whenever coil 198 is energized.

Figure 9:
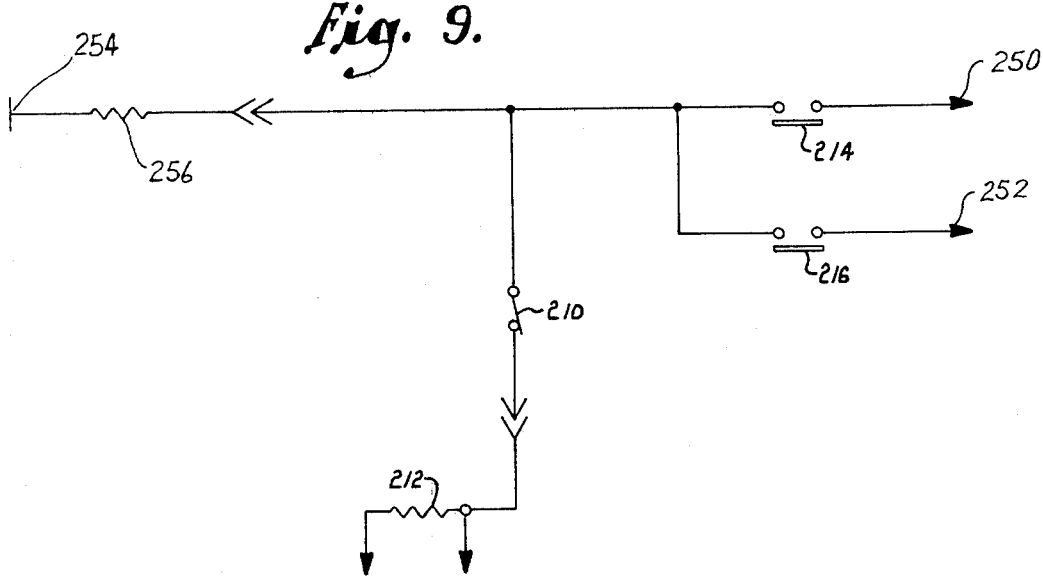
FIG. 9 is a schematic diagram of a modification that must be made in the standard throttle control circuitry to keep the locomotive from stalling upon initiation of the fuel save function.

Another modification made to each locomotive's control circuitry is shown in FIG. 9. The circuit shown in FIG. 9 monitors the throttle response of the locomotive. Relay coil 212 represents the loading characteristic of the engine generator. In order to keep the engine from stalling during the fuel save mode of operation, relay contact 210 is added to the conventional throttle control circuitry to remove the load characteristic 212 from the system when the locomotive is in the fuel save mode of operation. Relay contact 210 opens in response to energization of the engine run drop-out coil 194 (see FIGS. 4 and 5). Relay contacts 214 and 216 are not pertinent to an understanding of this invention and are closed when the locomotive system is in motion. A pair of outputs 250 and 252 are electrically coupled with other components of the throttle control circuitry to provide thereto an indication of the throttle response measured by the circuit of FIG. 9. Coil 212 is coupled in parallel with a negative terminal 254 through a relay coil 256.

In operation, each fuel saver set-up switch 34 is preset to its proper trail setting. In other words, the fuel saver set-up switch on the lead locomotive is set in the lead position while the fuel saver set-up switch on each trailing locomotive is set in the position representative of that locomotive's position within the system. For example, the fuel saver set-up switch on the number two trail unit is placed in the number two trail position, and so forth.

In the normal mode of operation, the fuel saver switch 26 is in the normal position 28 and all of the locomotives within the system respond to the throttle setting of the lead unit. Once full power is no longer required, the unit selector switch 30 is set to indicate which unit or units of the system are to be reduced in power and the fuel saver switch 26 is moved to the fuel save position 29 thereby initiating the fuel saving operation of the present invention. This operation is initiated by providing a fuel save signal in the form of a positive voltage signal from battery 51 to the throttle control circuitry 35 on one or more of the locomotives to place such locomotives in a throttle one position regardless of the throttle setting on the lead locomotive. The fuel save signal is directed to the appropriate locomotive within the system by means of the unit selector switch 30 and the fuel saver set-up switch 34. Once full power is again required, the fuel save switch 26 is returned to its normal position 28, thereby removing the fuel save signal from the system. The fuel save signal is a positive voltage signal which is provided to the control box 24 by means of input line 50.

Closure of fuel saver switch 26 initiates the fuel saving operation by providing the fuel save signal to the movable contact 54 of the unit selector switch 30 by means of conductor line 58. The fuel save signal is then provided to one of the stationary contacts 60, 66, 68, 70, 72 or 90 depending upon the setting of the unit selector switch. Lead contact 60 is connected directly to the lead unit's throttle control line 144 so that the fuel save signal will be provided directly to the circuitry 35 of the lead locomotive if the unit selector switch is placed in the lead position. Stationary contacts 66, 68, 70 and 72 on the other hand, represent the second unit, third unit, fourth unit and fifth unit positions and respectively provide the fuel save signal to the lead contacts 108, 112, 114 and 116 of the first 74, second 76, third 78 and fourth 80 gang sections of the fuel saver set-up switch 34 of the lead unit. When the unit selector switch is in the second/third unit position, movable contact 54 is in contact with stationary terminal 90 and the fuel save signal is simultaneously provided to lead contacts 108 and 112 of the first 74 and second 76 gang segments of the fuel saver set-up switch. The fuel save signal is sent from stationary contact 90 to the lead contact of the first gang segment 74 by means of conductor lines 124 and 110. The signal is also provided to movable contact arm 56 by means of conductor line 96. The fuel save signal is then transmitted to the lead contact on the second gang segment 76 of the unit selector switch by means of stationary contact 92 and conductor lines 126 and 118.

It should be emphasized at this time that the unit selector switch 30 shown in FIG. 4 is a six position switch which is specifically designed for a five unit system. The first five settings of this switch are for individually designating any one of the five locomotives of the system as the unit to be reduced in power. The sixth setting, on the other hand, simultaneously reduces the output power of the number two trail and number three trail units. The number of switch positions can, of course, be varied to accommodate larger or smaller locomotive systems and different combinations of units for removal. Furthermore, it is not imperative to the proper operation of the system that the number of switch positions on the unit selector switch be exactly matched with the number of locomotives in the system. For example, a unit selector switch with a fewer number of switch positions than locomotives in the system will be able to individually control only a portion of the total number of units. Similarly, a unit selector switch having more switch positions than locomotives has the capacity for adding additional locomotives to the system if this becomes desirable.

With the fuel saver set-up switch 34 on the lead unit placed in the lead position, movable contacts 100, 102, 104 and 106 direct the fuel save signal to the appropriate train line wires 128, 132, 134 and 136, depending upon the setting of unit selector switch 30. These train line wires are then interconnected to the corresponding train line wires on each of the trailing units by means of jumper cables (now shown). In this way, the fuel save signal is transmitted throughout the entire locomotive system.

Referring now to FIGS. 5-8, the train line wires on the trailing units are designated by the numerals 128, 132, 134 and 136 and are electrically coupled to the movable contacts of the fuel saver set-up switch 34 on each trailing unit of the system. The movable contacts on corresponding gang sections are electrically coupled to the same train line wires so that a fuel save signal on the train line 128 will be provided to the movable contact of the first gang segment of each set-up switch 34. Similarly, a fuel save signal on train line 132 will be directed to the movable contacts on the second gang segments, and so on. Furthermore, each gang segment has a different stationary contact connected to the throttle control line of the locomotive. In this way, the fuel save signal will be provided to the throttle control circuitry 35 on a particular locomotive only if the fuel save signal is provided to the movable contact of the appropriate gang segment of the fuel saver set-up switch by means of the proper train line wire.

For the purposes of discussion, it will be assumed that the unit selector switch 30 is set in the lead position as shown in FIG. 4. In this position, closure of the fuel save switch 26 transmits the fuel save signal to the lead contact 60 by means of conductor line 58 and movable contact 54. This signal is then directed to the circuitry 35 of the lead unit by means of conductor line 162 and throttle control line 144. Application of a fuel save signal to the circuitry 35 of the lead unit overrides the normal throttle setting on this unit, placing the unit in a throttle one position while leaving the trailing units unaffected.

However, if the unit selector switch 30 is in the second unit position as shown in broken lines in FIG. 4, then the fuel save signal will be directed to the second unit contact 66 by means of conductor line 58 and movable contact 54 upon closure of fuel save switch 26. The fuel save signal is then provided to the lead contact 108 on the first gang segment of fuel saver set-up switch 34 on the lead unit by means of conductor line 110. Movable contact 100 and conductor line 130 then transmit the fuel save signal to train line wire 128 which transmits the fuel save signal throughout the locomotive system.

Figure 6:
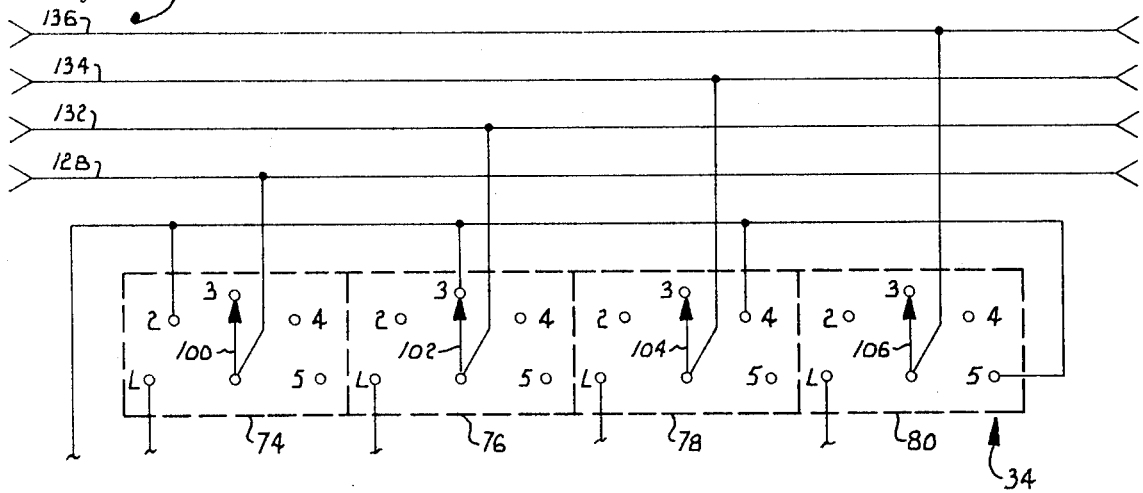
FIG. 6 is a schematic diagram of a fuel saver set-up switch which is installed on the number three trailing locomotive unit of the system, with the switch set in a "number three trail" positional setting.
Figure 7:
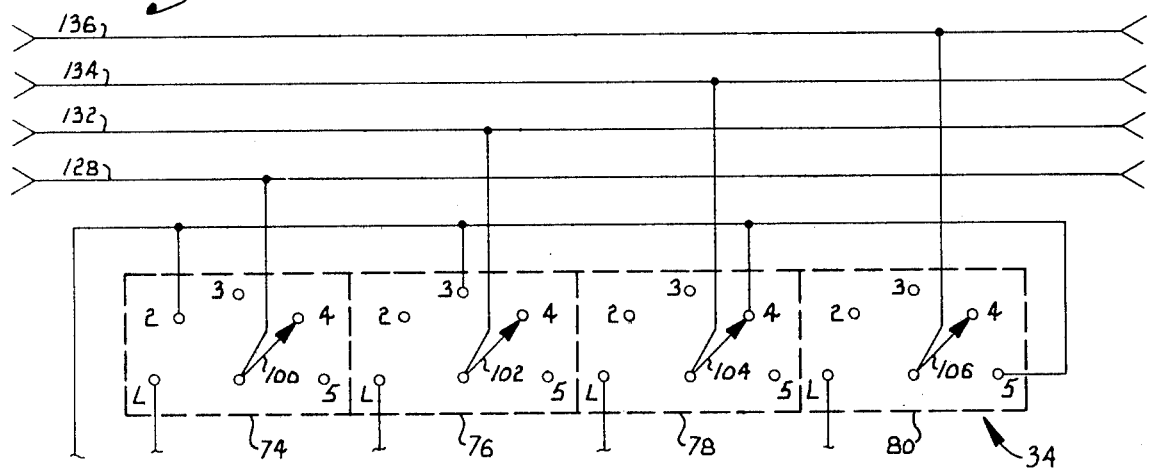
FIG. 7 is a schematic diagram of a fuel saver set-up switch which is installed on the number four trailing locomotive unit of the system, with the switch set in a "number four trail" positional setting.
Figure 8:
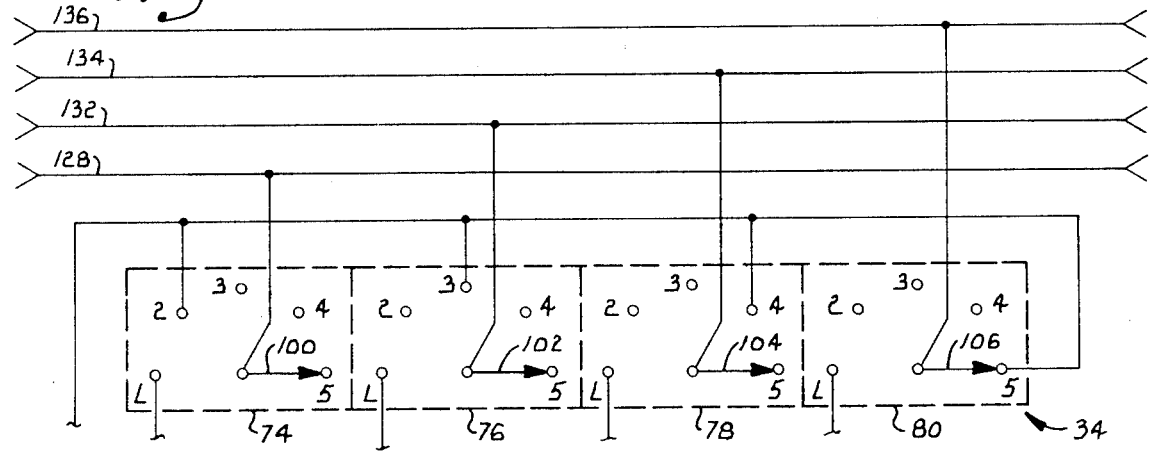
FIG. 8 is a schematic diagram of a fuel saver set-up switch which is installed on the number five trailing locomotive unit of the system, with the switch set in a "number five trail" positional setting.

Referring now to FIGS. 5–8, the fuel save signal on train line wire 128 will then be provided to the movable contact 100 of the first gang segment of each fuel saver set-up switch 34. The set-up switch 34 located on the number two trail unit is shown in FIG. 5 in its proper setting, namely the number two trail position. With the movable contacts in the number two trail position as shown in this figure, the fuel save signal will be provided to the throttle control line 178 of the number two locomotive by means of the number two trail contact 163 and conductor line 186. Since the fuel saver set-up switches shown in FIGS. 6, 7 and 8 are respectively set in the number three trail, number four trail and number five trail positions, the movable contacts on the fuel saver set-up switches of these units will not be in contact with their number two trail contact so that the fuel saver signal will not be provided to the throttle control circuitry of these locomotives.

Application of the fuel save signal to the circuitry 35 of any locomotive energizes relay coil 194. When coil 194 is energized, relay contact 196 moves from its normal position shown in FIGS. 4 and 5 into contact with stationary contact 218. Such movement of relay contact 196 removes the power signal from the engine run relay coil 208 thereby de-energizing this relay. De-energization of engine run relay coil 208 causes the corresponding relay contact (not shown) to be opened, thereby overriding the normal throttle control circuitry and placing the locomotive in a throttle one power condition. The engine run relay contact is connected in series with the control governor solenoids which regulate the speed of the engine. By opening the switch contact of the engine run relay, the governor solenoids are removed from the system and the locomotive is automatically placed in a throttle one power condition. In the fuel save operating condition, the engine run dropout relay contact 196 is in contact with terminal 218 thereby providing an activation signal to engine run extra relay 198. Activation of this relay causes the engine run extra relay contact 199 to be opened thereby removing the alarm from the system.

Activation of the engine run drop-out relay coil 194 also opens the engine run drop-out relay contact 210 shown in FIG. 9. By opening this circuit, load characteristic 212 is removed from the throttle control circuitry so that placement of the engine in a throttle one power condition will not cause the engine to stall.

It is an added feature of the present invention that the power output of a plurality of units can be controlled simultaneously rather than individually. In that case, the fuel save signal is simultaneously provided to more than one unit merely by setting the fuel saver set-up switch of two different units to the same trail position. For example, the fuel saver set-up switch on locomotives 12 and 14 could both be set in the number two trail position. Thereafter, anytime the unit selector switch on the lead unit is placed in the second unit position in the fuel save signal will be simultaneously provided to the throttle control circuitry on locomotives 12 and 14 thereby reducing the output power of these two locomotives.

From the foregoing, it will be seen that this invention is one well adapted to attain all ends and objects here and above set forth together with the other advantages which are obvious and which are inherent to the structure.

It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matters herein set forth or shown in the accompanying drawings are to be interpreted as illustrative and not in a limiting sense.

Having thus described the invention, I claim:

1. In a locomotive system including a plurality of locomotive units each having a power output level normally controlled by throttle control circuitry which is common to all of the locomotive units, a fuel saver arrangement for the locomotive system comprising: a plurality of override circuits corresponding to the respective locomotive units, each override circuit being normally open and being operable when completed to override said throttle control circuitry in a manner to reduce the power output level of the corresponding locomotive unit independently of the throttle control circuitry and the power output level of the remaining units; and selector means associated with the override circuits for selectively completing the override circuit corresponding to at least one selected locomotive unit which is to have its power output level reduced, said selector means having a normal setting wherein each override circuit is in its normally open condition to permit the throttle control circuitry to control the power output level of all of the locomotive units, and a fuel saver setting wherein the override circuit corresponding to said selected locomotive unit is completed to thereby reduce the power output level of the selected unit.

2. The invention set forth in claim 1, wherein said selector means includes: a multiple position selector switch having a plurality of settings corresponding to the respective override circuits; and a normally open fuel saver switch common to each override circuit to maintain each override circuit in its normally open condition when the fuel saver switch is in its normally open position, said fuel saver switch upon closure thereof effecting completion of the override circuit corresponding to the setting of the selector switch, thereby reducing the power output level of the selected locomotive unit.

3. The invention set forth in claim 2, wherein said selector switch and fuel saver switch are both located within a single one of the locomotive units.

4. The invention set forth in claim 3, including a plurality of multiple position set-up switches located within the respective locomotive units, each set-up switch having a selected position wherein the override circuit for the corresponding locomotive unit is completed through the set-up switch when said fuel saver switch is closed and said selector switch is in a setting corresponding to the locomotive containing the set-up switch.

5. A fuel saver arrangement for a multiple unit locomotive system including a plurality of electrically interconnected locomotives each having a power output level normally controlled by throttle control circuitry which is common to all of the locomotives and which normally maintains each locomotive at the same power output level, said fuel saver arrangement comprising: an override circuit for each locomotive adapted for connection to the throttle control circuitry, each override circuit having a normally open condition wherein the throttle control circuitry is unaffected and each override circuit having a completed condition wherein the override circuit overrides the throttle control circuit in a manner to reduce the power output level of the corresponding locomotive irrespective of the condition of the throttle control circuitry; a normally open fuel saver switch disposed in a circuit which is common to override circuit to thereby maintain each override circuit in its normally open condition when the fuel saver switch is in its normally open condition; and a selector switch having a plurality of settings corresponding to the respective override circuits, said selector switch completing the override circuit corresponding to the setting of the selector switch when the fuel saver switch is closed, whereby the power output level of at least one selected locomotive can be reduced by closing the fuel saver switch and positioning said selector switch in the setting corresponding to the override circuit of said selected locomotive.

6. The invention set forth in claim 5, including a multiple position set-up switch for each locomotive, each set-up switch being included in the override circuit for the corresponding locomotive and each set-up switch having a position wherein the corresponding override circuit is completed through the set-up switch when said fuel saver switch is closed and said selector switch is in the setting thereof corresponding to the override circuit of the set-up switch.

7. The invention set forth in claim 6, wherein the locomotive system includes a plurality of train line wires extending between the locomotives to electrically interconnect them, said train line wires forming portions of the respective override circuits which extend between the selector switch and the respective set-up switches.

8. A method of reducing the power output of a multiple unit locomotive system which includes a plurality of locomotives each having a power output normally controlled by throttle control circuitry common to all of the locomotives, said method comprising the steps of:
selecting at least one of the locomotives which is to have its power output reduced; and
overriding the throttle control circuitry in a manner to reduce the power output of said one locomotive independently of the throttle control circuitry while said throttle control circuitry continues to control the power output of the remaining locomotives.

9. A method as set forth in claim 8, wherein said overriding step includes the steps of:
generating an electrical signal; and
applying said electrical signal to said one locomotive in a manner to override the throttle control circuitry.

* * * * *